Nov. 17, 1931.  C. M. HEETER  1,832,024
COUPLING
Filed March 24, 1925
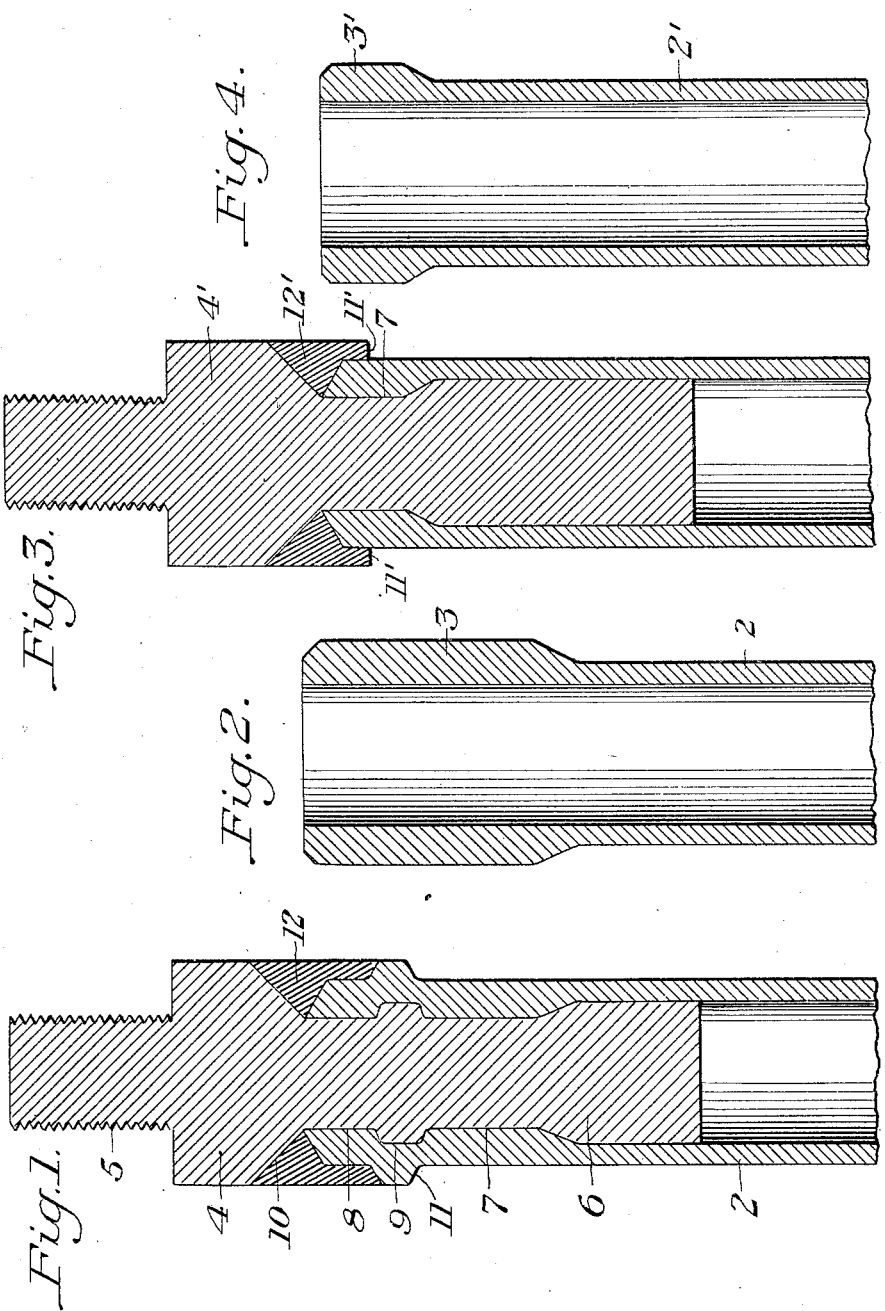
INVENTOR
Charles M. Heeter
By Byrnes, Stebbins & Parmelee
His Attys Patented Nov. 17, 1931

1,832,024

UNITED STATES PATENT OFFICE

CHARLES M. HEETER, OF BUTLER, PENNSYLVANIA; THE BUTLER COUNTY NATIONAL BANK & TRUST COMPANY, ADMINISTRATOR OF SAID CHARLES M. HEETER, DECEASED, ASSIGNOR TO COLONEL C. HEETER, JOSEPH W. HEETER, AND INEZ HEETER KETTERER, ALL OF BUTLER, PENNSYLVANIA

COUPLING

Application filed March 24, 1925. Serial No. 17,924.

The present invention relates broadly to couplings, and more particularly to couplings as adaptable to the art of connecting pins or plugs to pipes, tubes, and the like, to facilitate connection thereof in lengths or to other tools.

Considerable difficulty has heretofore been experienced in the connection of tubular bodies to pins or plugs due to the difference in the cross sectional areas of the respective bodies. In attempting to weld a pipe to a plug, it has been found that the pipe frequently burns before the plug has been heated to such a temperature as to enable the making of an effective weld. For this reason, it has heretofore been proposed to effect such a connection particularly as adaptable for the manufacture of sucker rods, and the like, for use in oil wells, by providing a pin or plug having a circumferentially extending recess, swaging a portion of the tube into such recess and surrounding the same by a band which is then shrunk or swaged into position. The parts are thereafter connected by welding if desired.

I have found that it is possible to obviate the use of a separate ring, thereby overcoming some of the difficulties involved in the making of couplings of this character, and it is one of the objects of the present invention to provide an improved coupling in which the tube is connected directly to the pin or plug without the necessity of a third coupling member.

In the accompanying drawings there are shown, for purposes of illustration only, certain preferred embodiments of the present invention, it being understood that the drawings do not define the limits of my invention, as changes in the construction and operation disclosed therein may be made without departing either from the spirit of the invention or the scope of my broader claim.

In the drawings:

Figure 1 is a longitudinal sectional view through a portion of a sucker rod embodying a coupling constructed in accordance with the present invention;

Figure 2 is a longitudinal sectional view through a portion of pipe as it is formed for the present coupling;

Figure 3 is a view corresponding to Figure 1, illustrating a slightly modified embodiment of the invention; and Figure 4 is a view similar to Figure 2, showing the construction of the pipe utilized in the formation of the coupling of Figure 3.

It is possible at the present time to obtain as a standard article of manufacture a pipe 2 having a thickened end portion 3, these thickened end portions usually being provided for the reception of threads. In accordance with the present invention, I provide a pipe having thickened end portions but smooth interior, the thickening preferably being effected in such manner as not to destroy or change the general contour of the opening through the pipe or its diameter.

The pipe constitutes one member of the coupling, the other member comprising a plug 4 having a reduced threaded projection 5 on one end and a reduced projection 6 on the opposite end. The intermediate portion of the projection 6 is preferably reduced in diameter at spaced points to provide circumferentially extending recesses 7 and 8 separated by a shoulder 9.

In making the coupling, the projection 6 is slipped longitudinally into the opening in the pipe 2 until the thickened end 3 of the pipe engages the inclined shoulder 10 on the plug. Thereupon further longitudinal movement of the parts is prevented and the upset end 3 of the pipe is then drawn inwardly into engagement with the surfaces of the recesses 7 and 8. While this operation may be accomplished as a cold drawing operation, the pipe is preferably heated before its application to the plug so that after the drawing-in is completed the pipe will subsequently contract and thereby shrink tightly into engagement with the plug. The depth of the recesses 7 and 8 is preferably such that when the upset end of the pipe is drawn into position the outer surface of the pipe, except where it passes over the shoulder 9, will be substantially flush with the general body thereof. Where the upset end 3 passes over the shoulder 9, the pipe will necessarily bend outwardly to form an external peripherally extending shoulder 11. This shoulder is admirably adapted for cooperation with elevators by means of which the sucker rod may be raised or lowered, as well understood in the art.

I have found that with a construction of this character, the drawing-in of the upset end of the pipe engages the the plug so tightly that the parts will be held effectively in position and against separation without any supplemental fastening means. Conveniently, however, after the parts are assembled in the manner referred to, they may be further secured by welding, as indicated generally by the reference character 12. Due to the thickened body of the pipe, its area is brought more nearly into proportion with the area of the plug, thereby greatly facilitating this welding operation.

In Figures 3 and 4, there is illustrated a slightly modified embodiment of the invention in which the plug 4' has a single recess 7' in which the upset end 3' of the pipe 2' is drawn. Thereafter, by welding as indicated at 12', there may be formed a peripheral shoulder 11' adapted for cooperation with elevators as before referred to.

It will be understood that the form of invention shown in Figure 1 may be utilized where great strength is required, the shoulder 9 serving as an additional interlock. In other cases, however, the form of joint shown in Figures 3 and 4 may be effectively employed.

The advantages of the present invention arise from the improved joint produced by utilizing a pipe having a thickened end adapted to cooperate with a recess or reduced portion of a plug or pin.

Further advantages arise from the method of making the coupling whereby the necessary strength is insured.

I claim:

A coupling having a tool engaging surface, comprising a pin provided with a preformed continuously extending peripheral recess having an offset intermediate its ends, and a tube having a thickened portion contracted about said offset and into said recess on opposite sides thereof, said tube having an annularly projecting shoulder substantially conforming to the maximum diameter of said pin and constituting a tool engaging surface, and a welding material connecting said shoulder and a portion of said pin.

In testimony whereof I have hereunto set my hand.

CHARLES M. HEETER.